United States Patent
Lee et al.

(10) Patent No.: US 10,873,744 B2
(45) Date of Patent: Dec. 22, 2020

(54) METHOD AND DEVICE FOR PROCESSING VIDEO SIGNAL BY MEANS OF AFFINE PREDICTION

(71) Applicant: LG ELECTRONICS INC., Seoul (KR)

(72) Inventors: Jaeho Lee, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/475,538

(22) PCT Filed: Jan. 3, 2018

(86) PCT No.: PCT/KR2018/000109
§ 371 (c)(1),
(2) Date: Jul. 2, 2019

(87) PCT Pub. No.: WO2018/128379
PCT Pub. Date: Jul. 12, 2018

(65) Prior Publication Data
US 2019/0342547 A1    Nov. 7, 2019

Related U.S. Application Data

(60) Provisional application No. 62/441,591, filed on Jan. 3, 2017, provisional application No. 62/441,592, filed on Jan. 3, 2017.

(51) Int. Cl.
*H04N 19/176* (2014.01)
*H04N 19/513* (2014.01)
(Continued)

(52) U.S. Cl.
CPC ......... *H04N 19/105* (2014.11); *H04N 19/139* (2014.11); *H04N 19/147* (2014.11);
(Continued)

(58) Field of Classification Search
None
See application file for complete search history.

(56) References Cited

U.S. PATENT DOCUMENTS 9,674,547 B2 *   6/2017   Kwon .................. G02B 27/646

FOREIGN PATENT DOCUMENTS

JP        09-121353 A      5/1997
JP        09-172644 A      6/1997
(Continued)

OTHER PUBLICATIONS

Lin et al., Affine transform prediction for next generation video coding, ISO/IEC JTC1/SC29/WG11 MPEG2015/ m37525 Oct. 2015, Geneva, Switzerland (Year: 2015).*

*Primary Examiner* — Alison Slater
(74) *Attorney, Agent, or Firm* — Dentons US LLP

(57) ABSTRACT

A method of processing a video signal including a current block using an affine prediction mode includes generating a candidate list of motion vector pairs using the motion vector of a pixel or block neighboring at least two control points of the current block, determining a final candidate list of a predetermined number of motion vector pairs based on a divergence value of the motion vector pair, where the final candidate list is determined in order of smaller divergence value, and the divergence value is a value indicating similarity in the direction of motion vectors, determining the control point motion vector of the current block based on a rate-distortion cost from the final candidate list, and generating the motion vector predictor of the current block based on the control point motion vector.

12 Claims, 14 Drawing Sheets

(51) Int. Cl.
    *H04N 19/139*     (2014.01)
    *H04N 19/44*     (2014.01)
    *H04N 19/147*     (2014.01)
    *H04N 19/50*     (2014.01)
    *H04N 19/105*     (2014.01)
    *H04N 19/46*     (2014.01)
    *H04N 19/96*     (2014.01)

(52) U.S. Cl.
    CPC ........... *H04N 19/176* (2014.11); *H04N 19/46* (2014.11); *H04N 19/96* (2014.11)

(56) References Cited

FOREIGN PATENT DOCUMENTS

| | | | |
|---|---|---|---|
| KR | 1020080088299 A | 10/2008 | |
| KR | 1020090083290 A | 8/2009 | |
| WO | 2015099816 A | 7/2015 | |

\* cited by examiner

[FIG. 1]
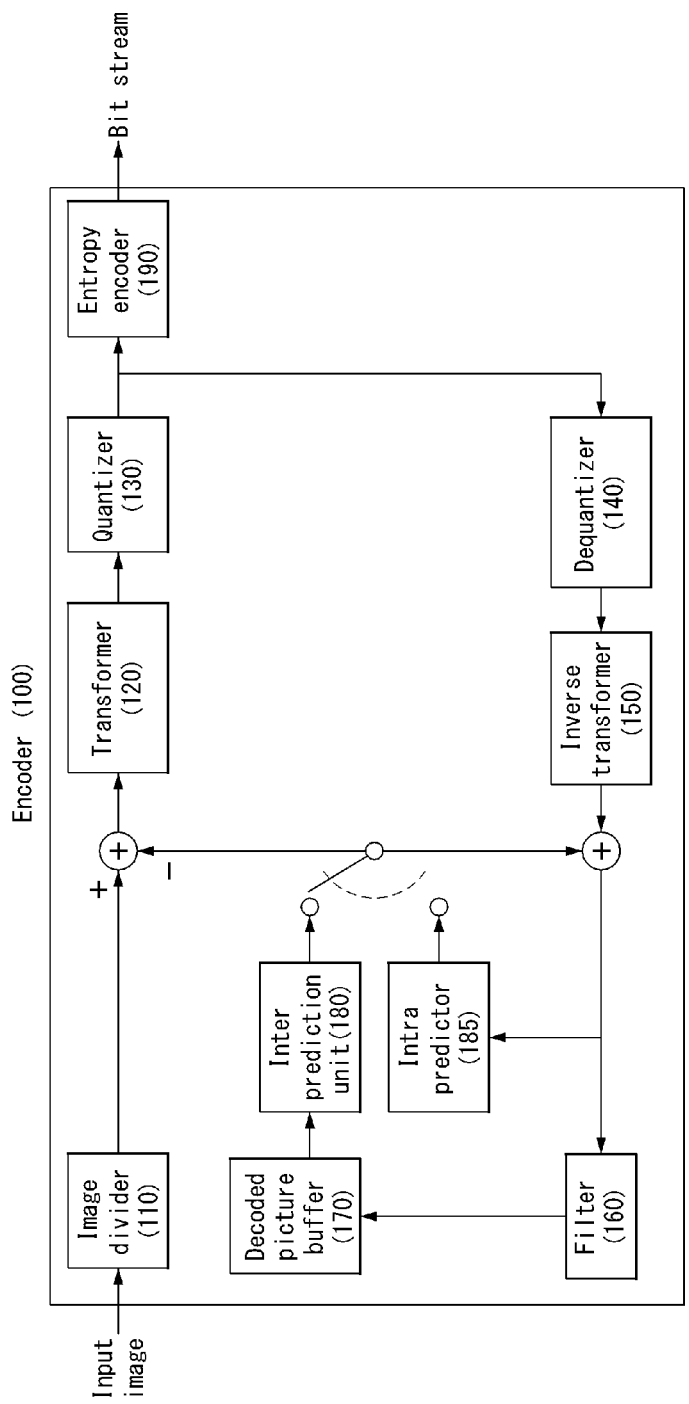

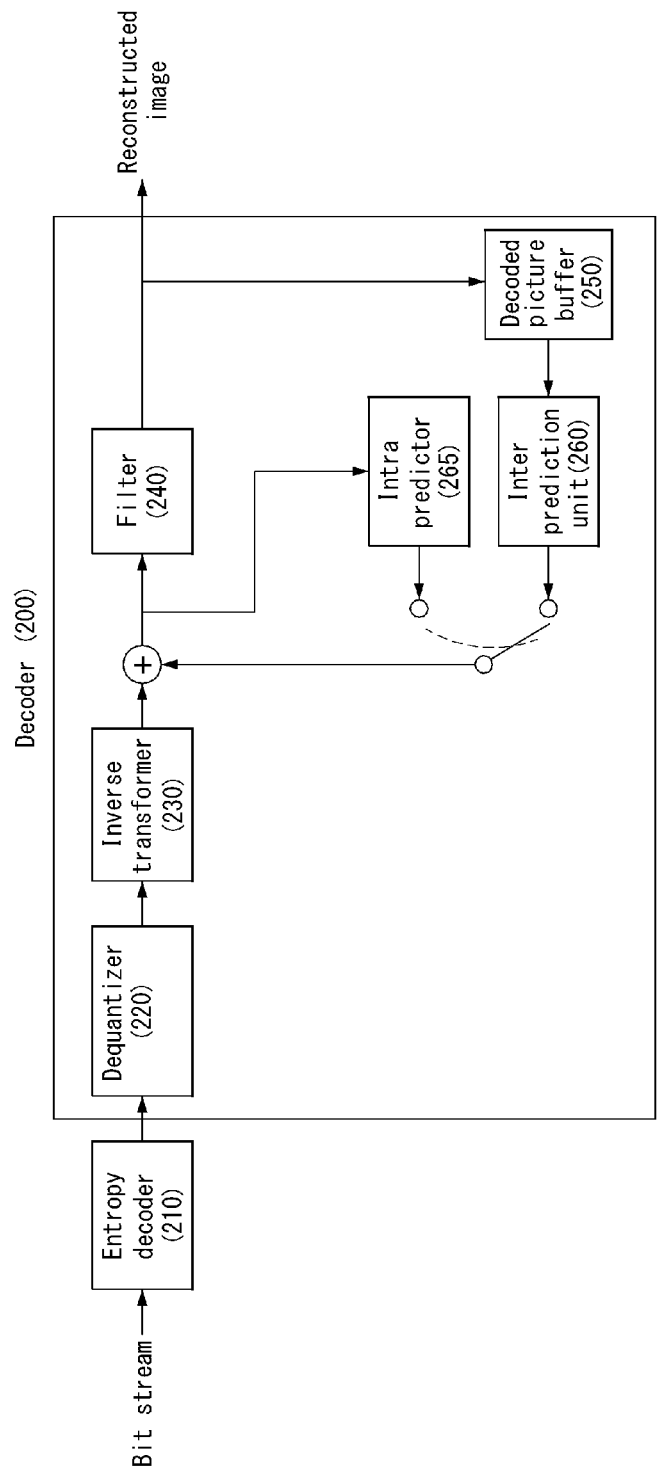
[FIG 2.]

[FIG. 3]
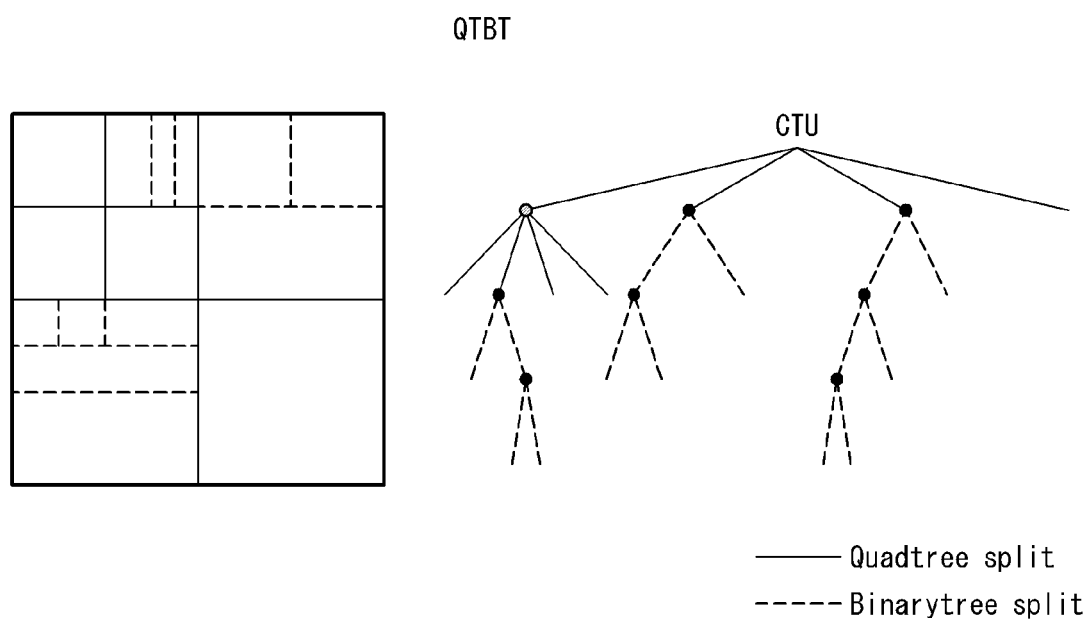

[FIG. 4]
(a)
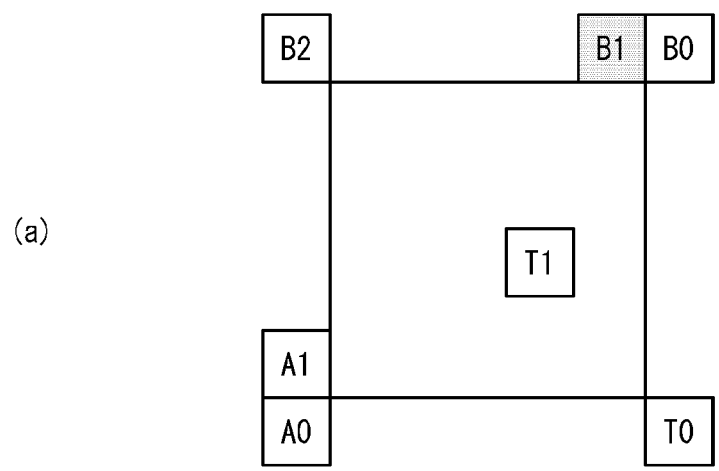
(b)
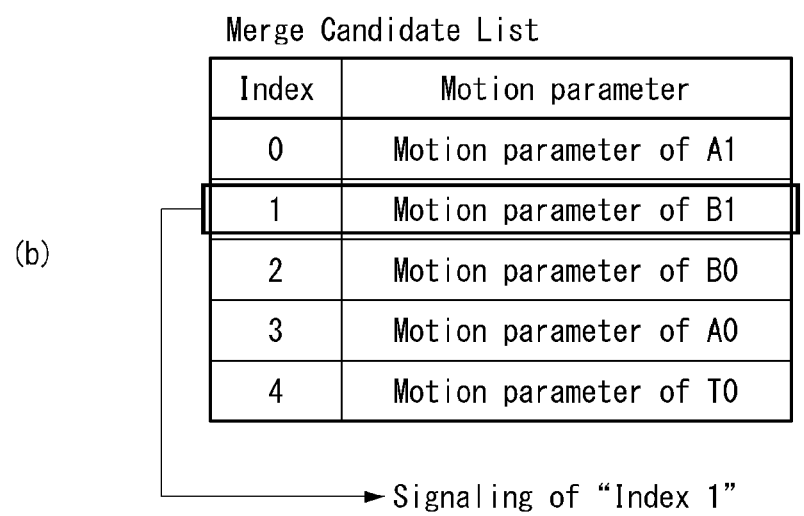

[FIG. 5]
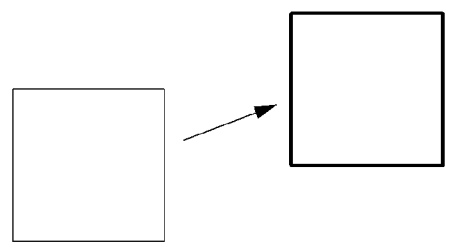
Translate
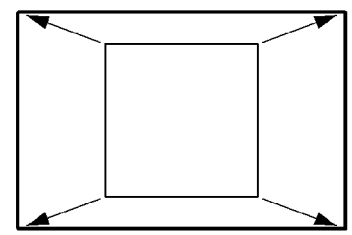
Scale
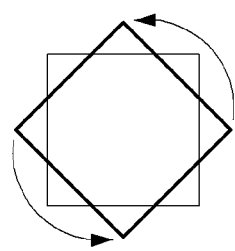
Rotate
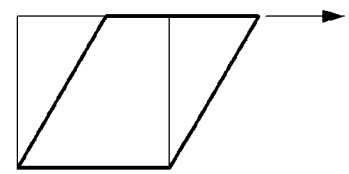
Shear

[FIG. 6]
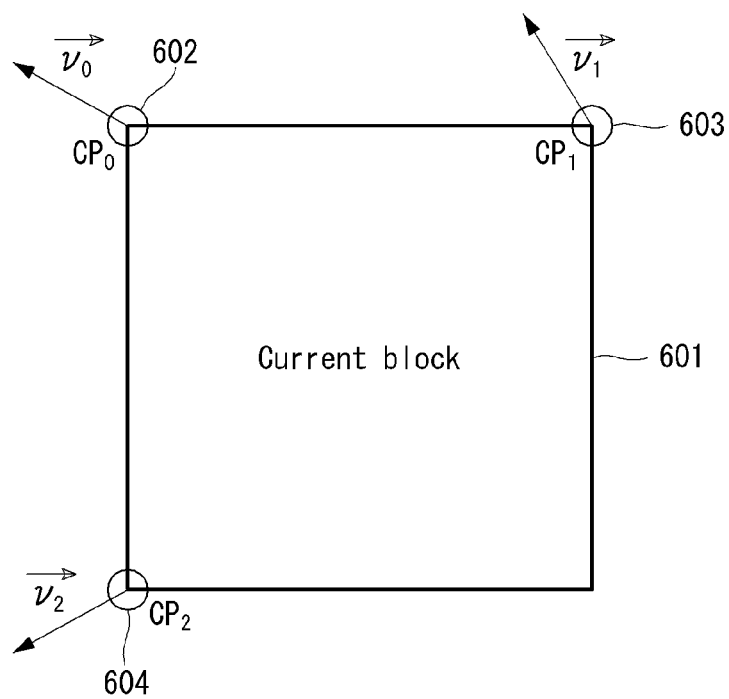

[FIG. 7]
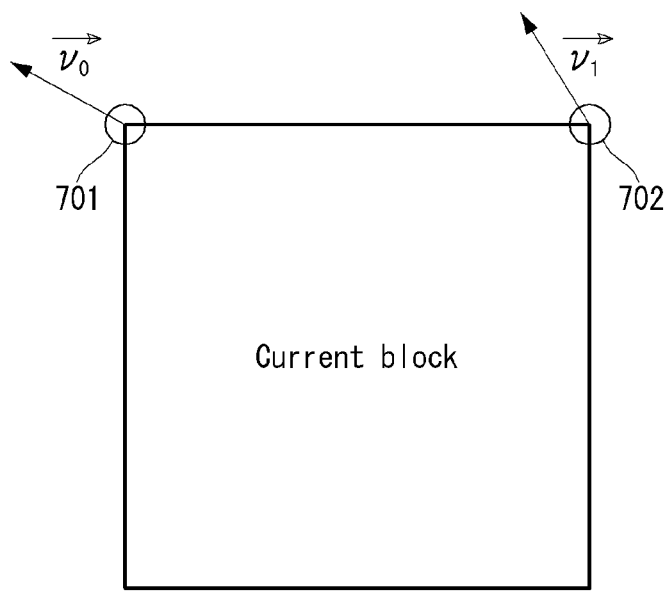

[FIG. 8]
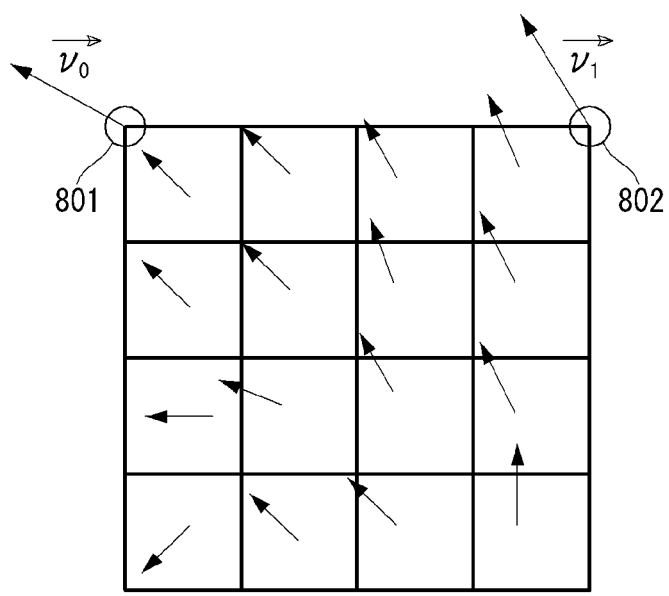

[FIG. 9]
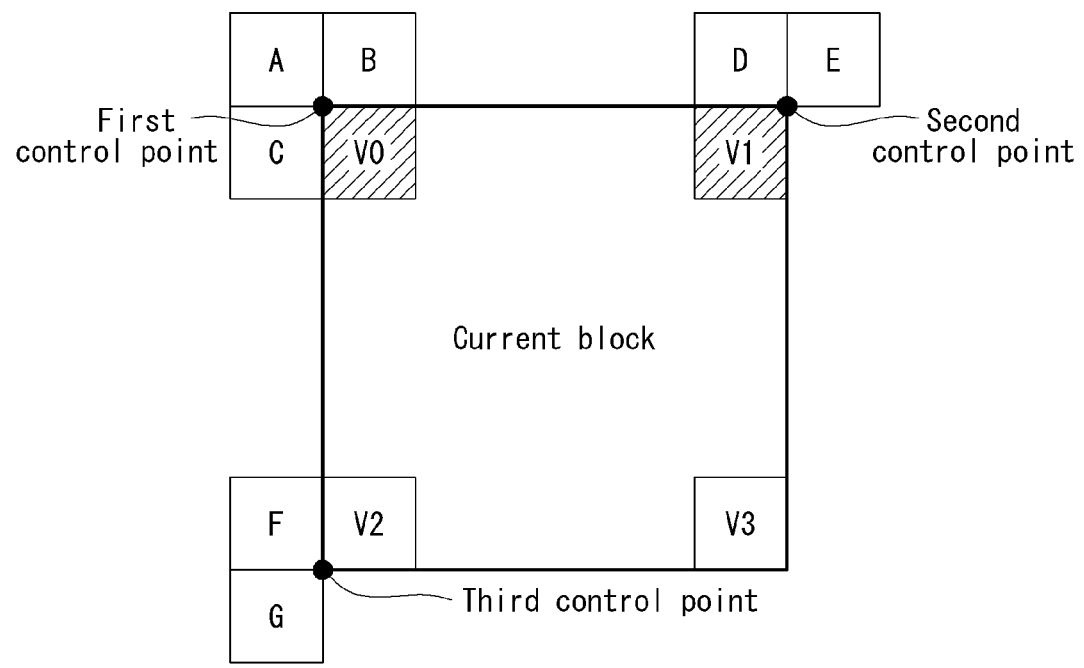

[FIG. 10]
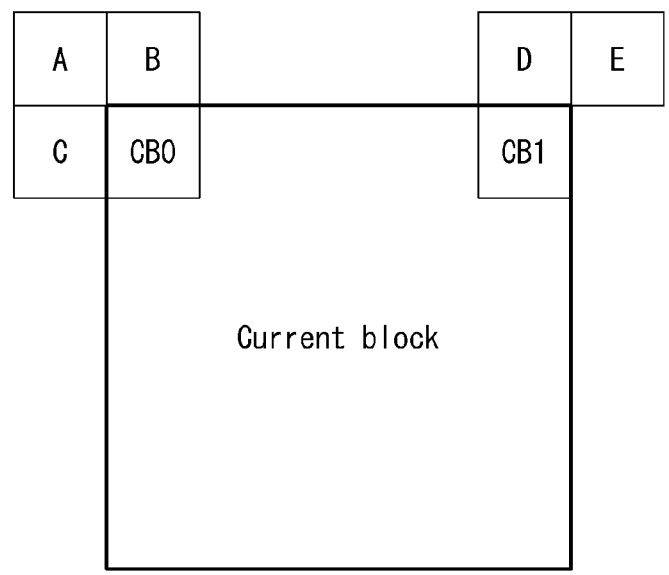

[FIG. 11]
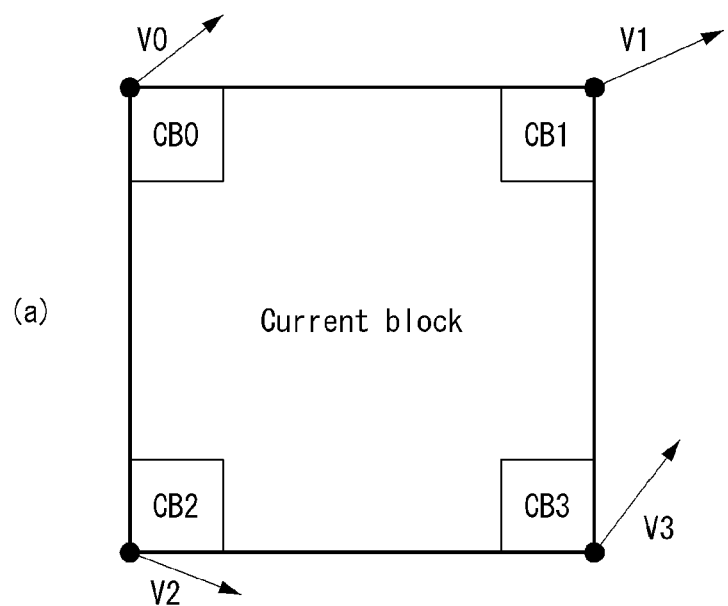
(a)
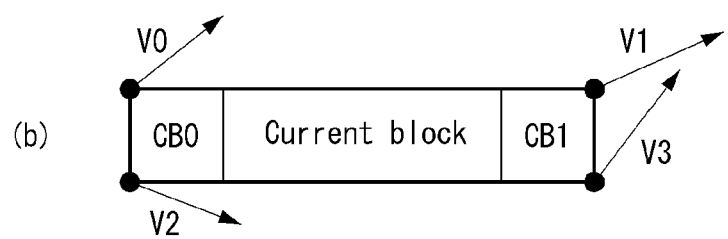
(b)

[FIG. 12]
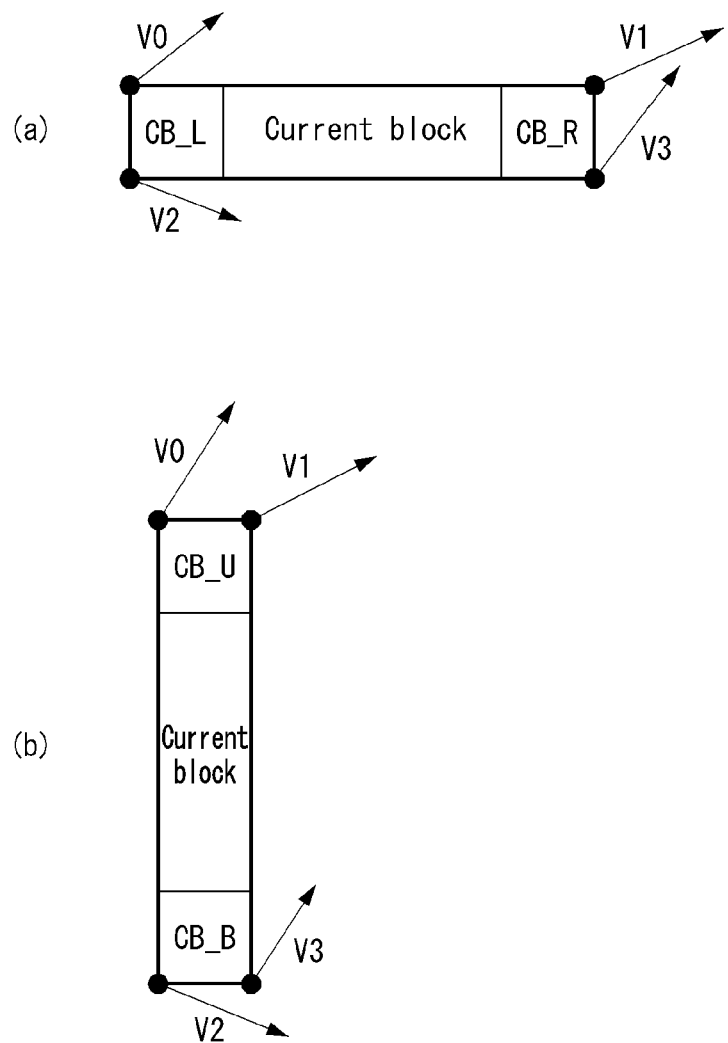

[FIG. 13]
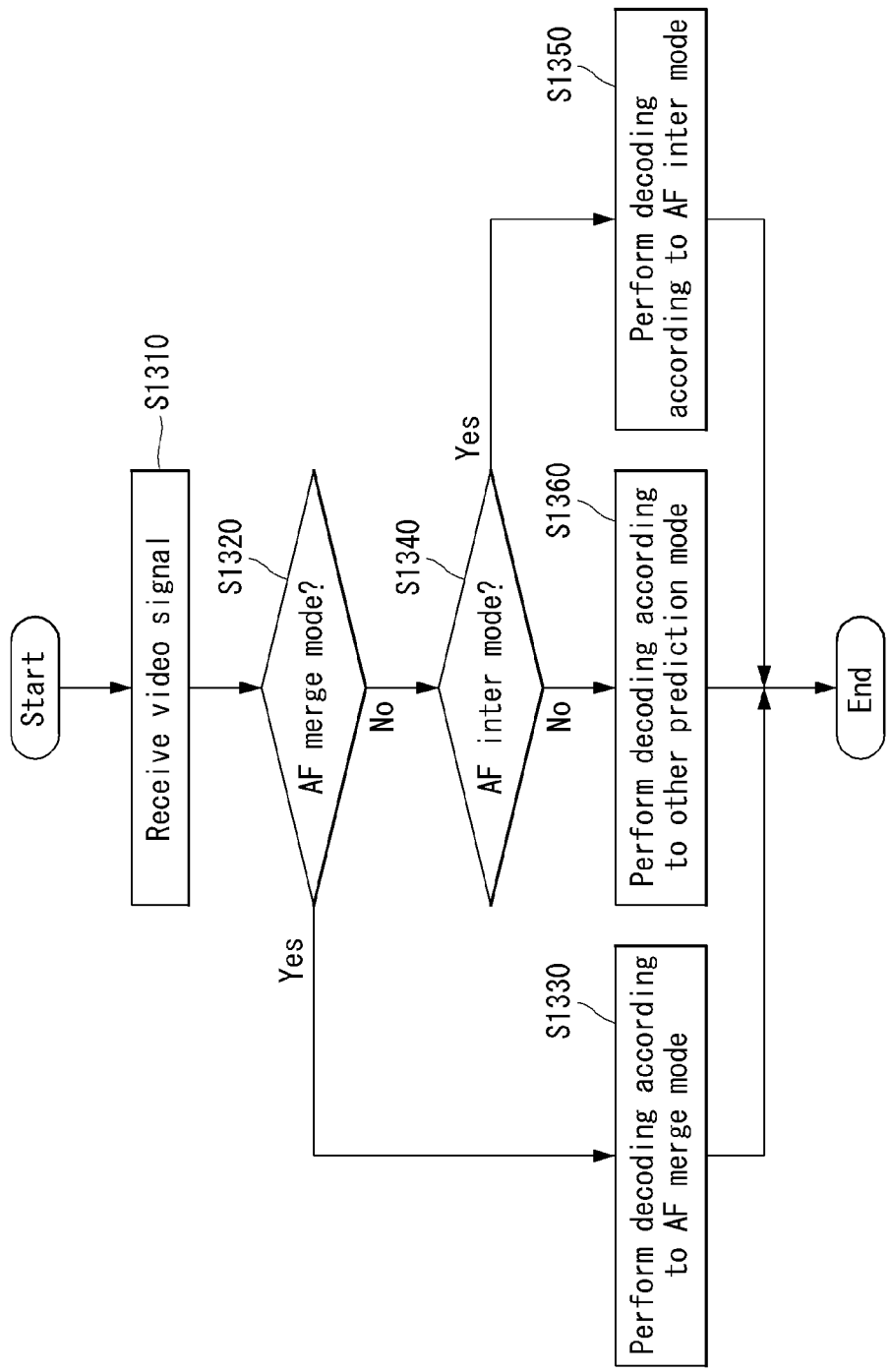

[FIG. 14]
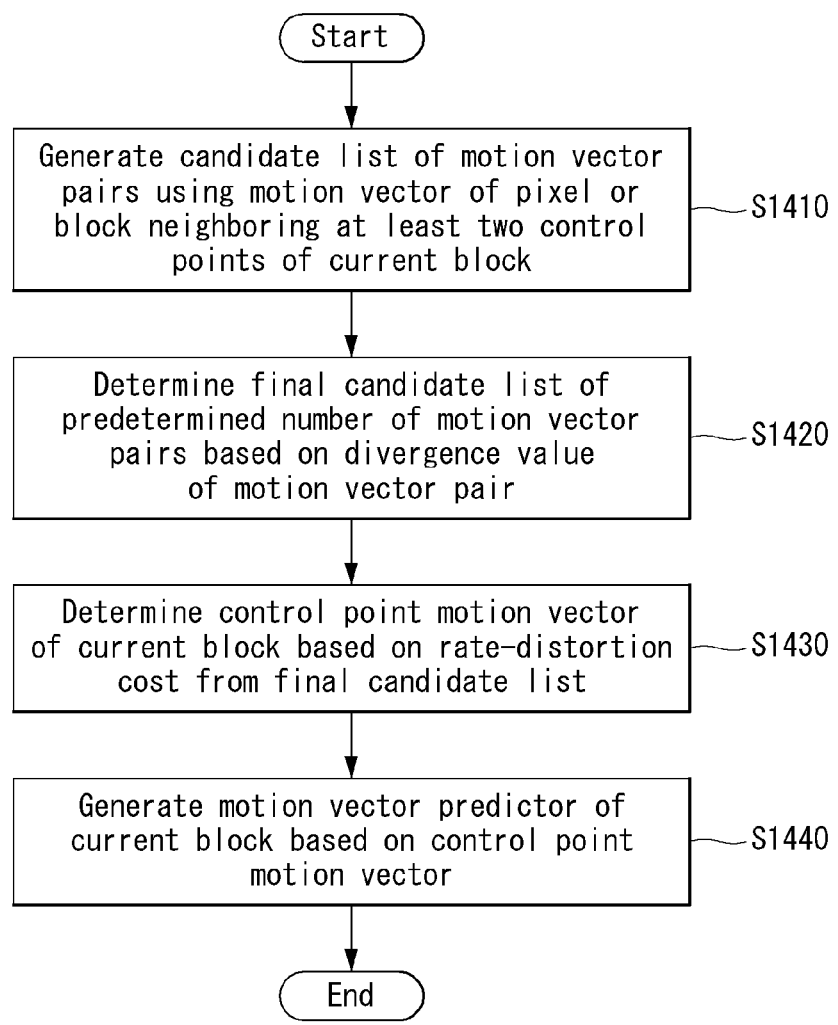

METHOD AND DEVICE FOR PROCESSING VIDEO SIGNAL BY MEANS OF AFFINE PREDICTION

CROSS-REFERENCE TO RELATED APPLICATIONS

This application is the National Stage filing under 35 U.S.C. 371 of International Application No. PCT/KR2018/000109, filed on Jan. 3, 2018, which claims the benefit of U.S. Provisional Applications No. 62/441,591, filed on Jan. 3, 2017 and No. 62/441,592, filed on Jan. 3, 2017 the contents of which are all hereby incorporated by reference herein in their entirety.

TECHNICAL FIELD

The present invention relates to a method and apparatus for encoding/decoding a video signal and, more particularly, to a method and apparatus for determining a control point motion vector for affine prediction.

BACKGROUND ART

Compression encoding means a series of signal processing technologies for transmitting digitalized information through a communication line or storing digitalized information in a form suitable for a storage medium. Media, such as video, images or voice, may be the subject of compression encoding. Particularly, a technology for performing compression encoding on an image is called video image compression.

Next-generation video content will have characteristics of high spatial resolution, a high frame rate, and high dimensionality of scene representation. In order to process such content, it will lead to a tremendous increase in terms of memory storage, a memory access rate, and processing power.

Accordingly, a coding tool for processing next-generation video content more efficiently needs to be designed.

DISCLOSURE

Technical Problem

The present invention is to propose a method of encoding, decoding a video signal more efficiently.

Furthermore, the present invention is to propose a method of determining a control point motion vector or control block motion vector for affine prediction.

Furthermore, the present invention is to propose a method of signaling an optimal control point motion vector or control block motion vector.

Furthermore, the present invention is to propose a method of defining the affine prediction ambiguity of a block including a corner point in a 4×N or N×4 block and solving the affine prediction ambiguity.

Furthermore, the present invention is to propose a method of identically allying the above methods to blocks having all sizes.

Technical Solution

In order to accomplish the objects, the present invention provides a method of determining a control point motion vector or control block motion vector for affine prediction.

Furthermore, the present invention provides a method of signaling an optimal control point motion vector or control block motion vector.

Furthermore, the present invention provides a method of defining the affine prediction ambiguity of a block including a corner point in a 4×N or N×4 block and solving the affine prediction ambiguity.

Furthermore, the present invention provides a method of identically allying the above methods to blocks having all sizes.

Advantageous Effects

The present invention can determine the motion vector of a corner pixel or corner block more precisely by providing a method of determining a control point motion vector or control block motion vector for affine prediction, and thus can generate a more precise motion vector field.

Furthermore, affine prediction ambiguity which may occur when the height or width of a block is 4 can be solved, and thus performance of affine prediction can be improved.

Furthermore, the present invention can perform more efficient coding by providing a method of signaling an optimal control point motion vector or control block motion vector.

DESCRIPTION OF DRAWINGS

FIG. 1 is an embodiment to which the present invention may be applied, and shows a schematic block diagram of an encoder in which the encoding of a video signal is performed.

FIG. 2 is an embodiment to which the present invention may be applied, and shows a schematic block diagram of an decoder in which the decoding of a video signal is performed.

FIG. 3 is an embodiment to which the present invention may be applied, and is a diagram for illustrating a quadtree binarytree (hereinafter referred to as a "QTBT") block partition structure.

FIG. 4 is an embodiment to which the present invention may be applied, and is a diagram for illustrating an inter prediction mode.

FIG. 5 is an embodiment to which the present invention may be applied, and is a diagram for illustrating an affine motion model.

FIGS. 6 and 7 are embodiments to which the present invention may be applied, and are diagrams for illustrating an affine motion prediction method using a control point motion vector.

FIG. 8 is an embodiment to which the present invention may be applied, and is a diagram for illustrating a motion vector field indicating a motion vector set of a coding block.

FIG. 9 is an embodiment to which the present invention may be applied, and is a diagram for illustrating a process of determining a control point motion vector for affine prediction.

FIG. 10 is an embodiment to which the present invention may be applied, and is a diagram for illustrating a method using a control block motion vector for affine prediction.

FIG. 11 is an embodiment to which the present invention may be applied, and is a diagram for illustrating a method of determining a control point motion vector when the height or width of a coding block is 4.

FIG. 12 is an embodiment to which the present invention may be applied, and is a diagram for illustrating a method of performing affine prediction on an N×4 block or 4×N block.

FIG. 13 is an embodiment to which the present invention may be applied, and is a flowchart illustrating a process of decoding a video signal according to an inter prediction mode.

FIG. 14 is an embodiment to which the present invention may be applied, and is a flowchart illustrating a process of processing a video signal including a current block using an affine prediction mode.

BEST MODE

The present invention provides a method of processing a video signal including a current block using an affine prediction mode, including a current block using an affine prediction mode, including generating a candidate list of motion vector pairs using the motion vector of a pixel or block neighboring at least two control points of the current block, wherein the control point means a corner pixel of the current block, and the motion vector pair indicates the motion vectors of a top left corner pixel and top right corner pixel of the current block; determining a final candidate list of a predetermined number of motion vector pairs based on a divergence value of the motion vector pair, wherein the final candidate list is determined in order of smaller divergence value, and the divergence value is a value indicating similarity in the direction of motion vectors; determining the control point motion vector of the current block based on a rate-distortion cost from the final candidate list; and generating the motion vector predictor of the current block based on the control point motion vector.

In the present invention, the control point includes at least two of the top left corner pixel, top right corner pixel, bottom left corner pixel or bottom right corner pixel of the current block, and the candidate list is configured with pixels or blocks neighboring the top left corner pixel, the top right corner pixel, and the bottom left corner pixel.

In the present invention, the candidate list is generated based on the motion vectors of a diagonal neighbor pixel A, top neighbor pixel B and left neighbor pixel C of the top left corner pixel, the motion vectors of a top neighbor pixel D and diagonal neighbor pixel E of the top right corner pixel, and the motion vectors of a left neighbor pixel F and diagonal neighbor pixel G of the bottom left corner pixel.

In the present invention, the method further includes adding an AMVP candidate list to the candidate list when the motion vector pairs of the candidate list are smaller than 2 in number.

In the present invention, the method further includes signaling a prediction mode or flag information indicating whether the affine prediction mode is performed. The affine prediction mode indicates a mode in which a motion vector is derived in a pixel or subblock unit using the control point motion vector of the current block.

In this case, the decoder may receive a prediction mode or flag information, may perform an affine prediction mode based on the prediction mode or the flag information, and may derive a motion vector according to the affine prediction mode.

In the present invention, when the current block is an N×4 size, the control point motion vector of the current block is determined as a motion vector derived based on the center position of a left subblock and right subblock within the current block. When the current block is a 4×N size, the control point motion vector of the current block is determined as a motion vector derived based on the center position of a top subblock and bottom subblock within the current block.

In the present invention, when the current block is an N×4 size, the control point motion vector of a left subblock within the current block is determined by an average value of a first control point motion vector and a third control point motion vector, and the control point motion vector of a right subblock is determined by an average value of a second control point motion vector and a fourth control point motion vector. When the current block is a 4×N size, the control point motion vector of a top subblock within the current block is determined by an average value of a first control point motion vector and a second control point motion vector, and the control point motion vector of a bottom subblock is determined by an average value of a third control point motion vector and a fourth control point motion vector.

The present invention provides an apparatus for processing a video signal including a current block using an affine prediction mode, including an inter prediction unit configured to generate a candidate list of motion vector pairs using the motion vector of a pixel or block neighboring at least two control points of the current block, determine a final candidate list of a predetermined number of motion vector pairs based on a divergence value of the motion vector pair, determine the control point motion vector of the current block based on a rate-distortion cost from the final candidate list, and generate the motion vector predictor of the current block based on the control point motion vector. The control point means a corner pixel of the current block. The motion vector pair indicates the motion vectors of a top left corner pixel and top right corner pixel of the current block. The final candidate list is determined in order of smaller divergence value, and the divergence value is a value indicating similarity in the direction of motion vectors.

In the present invention, the inter prediction unit is configured to add an AMVP candidate list to the candidate list when the motion vector pairs of the candidate list are smaller than 2 in number.

In the present invention, the inter prediction unit of the decoder receives a prediction mode or flag information indicating whether an affine prediction mode is performed. The inter prediction unit performs the affine prediction mode based on the prediction mode or the flag information, and may derive a motion vector according to the affine prediction mode. In this case, the affine prediction mode indicates a mode in which the motion vector is derived in a pixel or sub-block unit using the control point motion vector of a current block.

MODE FOR INVENTION

Hereinafter, constructions and operations according to embodiments of the present invention are described with reference to the accompanying drawings. The constructions and operations of the present invention described with reference to the drawings are described as only embodiments, and the technical spirit and kernel construction and operation of the present invention are not restricted by the constructions and operations.

Furthermore, common terms that are now widely used are selected as terms used in the present invention, but terms randomly selected by the applicant are used in specific cases. In such a case, a corresponding term should not be interpreted based on only the name of a term used in the description of this specification because the meaning of the corresponding term is clearly described in the detailed description of a corresponding part, but should be interpreted by checking even the meaning of the corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting and division may be properly replaced and interpreted in each coding process.

FIG. 1 is an embodiment to which the present invention may be applied, and shows a schematic block diagram of an encoder in which the encoding of a video signal is performed.

Referring to FIG. 1, the encoder 100 may be configured to include a image divider 110, a transformer 120, a quantizer 130, a dequantizer 140, an inverse transformer 150, a filter 160, a decoded picture buffer (DPB) 170, an inter prediction unit 180, an intra predictor 185, and an entropy encoder 190.

The image divider 110 may divide an input image (or, picture, frame), input to the encoder 100, into one or more processing units. For example, the processing unit may be a coding tree unit (CTU), a coding unit (CU), a prediction unit (PU) or a transform unit (TU).

However, the terms are merely used for convenience of description for the present invention, and the present invention is not limited to the definition of a corresponding term. Furthermore, in this specification, for convenience of description, a video signal is used as a unit used in a process of encoding or decoding a video signal, but the present invention is not limited thereto and a video signal may be properly interpreted based on invention contents.

The encoder 100 may generate a residual signal by subtracting a prediction signal, output from the inter prediction unit 180 or the intra predictor 185, from the input image signal. The generated residual signal is transmitted to the transformer 120.

The transformer 120 may generate a transform coefficient by applying a transform scheme to the residual signal. A transform process may be applied to a square pixel block having the same size and may also be applied to a block of a variable size not a square.

The quantizer 130 may quantize the transform coefficient and transmit it to the entropy encoder 190. The entropy encoder 190 may entropy-code the quantized signal and output it as a bit stream.

The quantized signal output from the quantizer 130 may be used to generate a prediction signal. For example, the quantized signal may reconstruct a residual signal by applying dequantization and inverse transform through the dequantizer 140 and the inverse transformer 150 within a loop. A reconstructed signal may be generated by adding the reconstructed residual signal to the prediction signal output from the inter prediction unit 180 or the intra predictor 185.

Meanwhile, artifacts in which a block boundary is viewed may occur because neighbor blocks are quantized by different quantization parameters in the compression process. Such a phenomenon is called blocking artifacts, which are one of important factors to evaluate picture quality. In order to reduce such artifacts, a filtering process may be performed. Picture quality can be improved by removing blocking artifacts and also reducing an error of a current picture through such a filtering process.

The filter 160 applies filtering to the reconstructed signal and outputs the filtered signal to a playback device or transmits the filtered signal to the decoded picture buffer 170. The filtered signal transmitted to the decoded picture buffer 170 may be used as a reference picture in the inter prediction unit 180. As described above, not only picture quality, but coding efficiency can be improved using the filtered picture as a reference picture in an interframe prediction mode.

The decoded picture buffer 170 may store the filtered picture in order to use it as a reference picture in the inter prediction unit 180.

The inter prediction unit 180 performs temporal prediction and/or spatial prediction in order to remove temporal redundancy and/or spatial redundancy with reference to a reconstructed picture. In this case, the reference picture used to perform prediction may include blocking artifacts or ringing artifacts because it is a signal transformed through quantization and dequantization in a block unit upon coding/decoding before.

Accordingly, the inter prediction unit 180 may interpolate a signal between pixels in a subpixel unit by applying a lowpass filter in order to solve performance degradation attributable to the discontinuity or quantization of a signal. In this case, the subpixel means a virtual pixel generated by applying an interpolation filter, and an integer pixel means an actual pixel present in a reconstructed picture. Linear interpolation, bi-linear interpolation or a Wiener filter may be applied as an interpolation method.

The interpolation filter may be applied to a reconstructed picture to improve the precision of prediction. For example, the inter prediction unit 180 may generate an interpolation pixel by applying the interpolation filter to an integer pixel, and may perform prediction using an interpolated block configured with interpolated pixels as a prediction block.

The intra predictor 185 may predict a current block with reference to surrounding samples of a block on which encoding is to be now performed. The intra predictor 185 may perform the following process in order to perform intra prediction. First, a reference sample necessary to generate a prediction signal may be prepared. Furthermore, a prediction signal may be generated using the prepared reference sample. Thereafter, a prediction mode is encoded. In this case, the reference sample may be prepared through reference sample padding and/or reference sample filtering. The reference sample may include a quantization error because it has experienced a prediction and reconstruction process. Accordingly, in order to reduce such an error, a reference sample filtering process may be performed on each prediction mode used for intra prediction.

The prediction signal generated through the inter prediction unit 180 or the intra predictor 185 may be used to generate a reconstructed signal or may be used to generate a residual signal.

FIG. 2 is an embodiment to which the present invention may be applied, and shows a schematic block diagram of an decoder in which the decoding of a video signal is performed.

Referring to FIG. 2, the decoder 200 may be configured to include a parsing unit (not shown), an entropy decoder 210, a dequantizer 220, an inverse transformer 230, a filter 240, a decoded picture buffer (DPB) 250, an inter prediction unit 260, an intra predictor 265, and a reconstruction unit (not shown).

For another example, the decoder 200 may be simply represented as including a parsing unit (not shown), a block partition determination unit (not shown), and a decoding unit (not shown). In this case, embodiments applied to the present invention may be performed through the parsing unit (not shown), the block partition determination unit (not shown), and the decoding unit (not shown).

The decoder 200 may receive a signal output from the encoder 100 of FIG. 1, and may parse or obtain a syntax element through the parsing unit (not shown). The parsed or obtained signal may be entropy-decoded through the entropy decoder 210.

The dequantizer 220 obtains a transform coefficient from the entropy-decoded signal using quantization step size information.

The inverse transformer 230 obtains a residual signal by inverse-transforming the transform coefficient.

The reconstruction unit (not shown) generates a reconstructed signal by adding the obtained residual signal to a prediction signal output from the inter prediction unit 260 or the intra predictor 265.

The filter 240 applies filtering to the reconstructed signal and outputs the filtered signal to a playback device or transmits the filtered signal to the decoded picture buffer 250. The filtered signal transmitted to the decoded picture buffer 250 may be used as a reference picture in the inter prediction unit 260.

In this specification, the embodiments described in the filter 160, inter prediction unit 180 and intra predictor 185 of the encoder 100 may be identically applied to the filter 240, inter prediction unit 260 and intra predictor 265 of the decoder, respectively.

A reconstructed video signal output through the decoder 200 may be played back through a playback device.

FIG. 3 is an embodiment to which the present invention may be applied, and is a diagram for illustrating a quadtree binarytree (hereinafter referred to as a "QTBT") block partition structure.

Quad-Tree Binary-Tree (QTBT)

A QTBT refers to the structure of a coding block in which a quadtree structure and a binarytree structure have been combined. Specifically, in a QTBT block partition structure, an image is coded in a CTU unit. A CTU is split in a quadtree form, and a leaf node of the quadtree is additionally split in a binarytree form.

A QTBT structure and a split flag syntax supporting the same are described below with reference to FIG. 3.

Referring to FIG. 3, a current block may be partitioned in a QTBT structure. That is, a CTU may be first split hierarchically in a quadtree form. Furthermore, a leaf node of a quadtree that is no longer split in a quadtree form may be partitioned hierarchically in a binary tree form.

The encoder may signal a split flag in order to determine whether to split a quadtree in a QTBT structure. In this case, the quadtree split may be adjusted (or limited) by a MinQTLumaISlice, MinQTChromaISlice or MinQTNonISlice value. In this case, MinQTLumaISlice indicates a minimum size of a quadtree leaf node of a luma component in an I-slice. MinQTLumaChromaISlice indicates a minimum size of a quadtree leaf node of a chroma component in an I-slice. MinQTNonISlice indicates a minimum size of a quadtree leaf node in a non I-slice.

In the quadtree structure of a QTBT, a luma component and a chroma component may have independent split structure in an I-slice. For example, in the case of an I-slice in a QTBT structure, the split structures of a luma component and a chroma component may be differently determined. In order to support such split structures, MinQTLumaISlice and MinQTChromaISlice may have different values.

For another example, in the non I-slice of a QTBT, a quadtree structure may be determined to have the same split structure for a luma component and a chroma component. For example, in the case of a non I-slice, the quadtree split structures of a luma component and a chroma component may be adjusted by a MinQTNonISlice value.

In a QTBT structure, a leaf node of a quadtree may be partitioned in a binarytree form. In this case, binarytree split may be adjusted (or limited) by MaxBTDepth, MaxBTDepthISliceL and MaxBTDepthISliceC. In this case, MaxBTDepth indicates a maximum depth of binarytree split based on a leaf node of a quadtree in a non I-slice, MaxBTDepthISliceL indicates a maximum depth of binarytree split of a luma component in an I-slice, and MaxBTDepthISliceC indicates a maximum depth of binarytree split of a chroma component in the I-slice.

Furthermore, in the I-slice of the QTBT, MaxBTDepthISliceL and MaxBTDepthISliceC may have different values in the I-slice because the luma component and the chroma component may have different structures.

Furthermore, the BT of the QTBT may be split horizontally or vertically. Accordingly, split direction information (e.g., BTSplitMode) regarding that the BT will be split in which direction in addition to a BT split flag (e.g., BinarySplitFlag) indicating whether the BT will be split needs to be signaled.

In an embodiment, in a QTBT structure, split direction information (BTSplitMode) may be signaled when a BT split flag (BinarySplitFlag) is not 0. For example, a BT may be split horizontally when BTSplitMode is 0, and may be split vertically when BTSplitMode is 1.

Meanwhile, in the split structure of a QTBT, both a quadtree structure and a binarytree structure may be used together. In this case, the following rule may be applied.

First, MaxBTSize is smaller than or equal to MaxQTSize. In this case, MaxBTSize indicates a maximum size of binarytree split, and MaxQTSize indicates a maximum size of quadtree split.

Second, a leaf node of a QT becomes the root of a BT.

Third, a BT cannot be split into a QT again once it is split.

Fourth, a BT defines vertical split and horizontal split.

Fifth, MaxQTDepth and MaxBTDepth are previously defined. In this case, MaxQTDepth indicates a maximum depth of quadtree split, and MaxBTDepth indicates a maximum depth of binarytree split.

Sixth, MaxBTSize and MinQTSize may be different depending on a slice type.

FIG. 4 is an embodiment to which the present invention may be applied, and is a diagram for illustrating an inter prediction mode.

Inter Prediction Mode

In an inter prediction mode to which the present invention is applied, in order to reduce the amount of motion information, a merge mode, an advanced motion vector prediction (AMVP) mode or an affine mode may be used. In this case, the affine mode is a mode using an affine motion model, and may include at least one of an affine merge mode or an affine inter mode.

1) Merge Mode

The merge mode means a method of deriving a motion parameter (or information) from a spatially or temporally neighbor block.

A set of candidates available in the merge mode is configured with spatial neighbor candidates, temporal candidates, and generated candidates.

Referring to FIG. 4(a), whether each spatial candidate block is available is determined in order of {A1, B1, B0, A0, B2}. In this case, if a candidate block has been encoded in an intra prediction mode and thus motion information is not present or a candidate block is located out of a current picture (or slice), a corresponding candidate block cannot be used.

After the validity of the spatial candidate is determined, spatial merging candidates may be constructed by excluding an unnecessary candidate block from the candidate block of a current processing block. For example, if the candidate block of a current prediction block is the first prediction block within the same coding block, the corresponding candidate block may be excluded and candidate blocks having the same motion information may also be excluded.

When the spatial merging candidate construction is completed, a temporal merging candidate construction process is performed in order of {T0, T1}.

In the temporal candidate construction, if the bottom right block T0 of the collocated block of a reference picture is available, the corresponding block may be constructed as a temporal merging candidate. A collocated block means a block present at a location corresponding to a current processing block in a selected reference picture. In contrast, if not, a block T1 located at the center of the collocated block may be constructed as a temporal merging candidate.

A maximum number of merging candidates may be specified in a slice header. When the number of merging candidates is greater than a maximum number, spatial candidates and temporal candidates having a number smaller than the maximum number are maintained. If not, additional merging candidates (i.e., combined bi-predictive merging candidates) are generated by combining candidates added so far until the number of candidates becomes the maximum number.

The encoder configures a merge candidate list using the above method, and signals, to the decoder, candidate block information selected from the merge candidate list as a merge index (e.g., merge_idx[x0][y0]') by performing motion estimation. FIG. 4(b) illustrates a case where a B1 block has been selected in the merge candidate list. In this case, "index 1(Index 1)" may be signaled to the decoder as a merge index.

The decoder configures a merge candidate list in the same manner as that performed by the encoder, and derives motion information for a current block from motion information of a candidate block, corresponding to a merge index received from the encoder, from the merge candidate list. Furthermore, the decoder generates a prediction block for a current processing block based on the derived motion information.

2) Advanced Motion Vector Prediction (AMVP) Mode

The AMVP mode means a method of deriving a motion vector prediction value from a surrounding block. Accordingly, a horizontal and vertical motion vector difference (MVD), a reference index, and an inter prediction mode are signaled to the decoder. A horizontal and vertical motion vector value is calculated using a derived motion vector prediction value and a motion vector difference (MVD) provided by the encoder.

That is, the encoder configures a motion vector prediction value candidate list, and signals, to the decoder, a motion reference flag (i.e., candidate block information) (e.g., mvp_IX_flag[x0][y0]') selected from the motion vector prediction value candidate list by performing motion estimation. The decoder configures the motion vector prediction value candidate list in the same manner as that performed by the encoder, and derives a motion vector prediction value of a current processing block using motion information of a candidate block, indicated in a motion reference flag received from the encoder, from the motion vector prediction value candidate list. Furthermore, the decoder obtains a motion vector value of the current processing block using the derived motion vector prediction value and a motion vector difference transmitted by the encoder. Furthermore, the decoder generates a prediction block for the current processing block based on the derived motion information (i.e., motion compensation).

In the case of the AMVP mode, two of the five available spatial motion candidates in FIG. 4 are selected. The first spatial motion candidate is selected from a {A0, A1} set located on the left. The second spatial motion candidate is selected from a {B0, B1, B2} set located at the top. In this case, if the reference index of a neighbor candidate block is not the same as a current prediction block, a motion vector is scaled.

If the number of candidates selected as a result of the search of the spatial motion candidates is two, the candidate configuration is terminated. If the number of candidates is less than 2, a temporal motion candidate is added.

The decoder (e.g., inter prediction unit) decodes a motion parameter for a processing block (e.g., prediction unit).

For example, if a processing block uses the merge mode, the decoder may decode a merge index signaled by the encoder. Furthermore, the decoder may derive the motion parameter of a current processing block from the motion parameter of a candidate block indicated in a merge index.

Furthermore, if the AMVP mode has been applied to the processing block, the decoder may decode a horizontal and vertical motion vector difference (MVD), a reference index, and an inter prediction mode signaled by the encoder. Furthermore, the decoder may derive a motion vector prediction value from the motion parameter of a candidate block indicated in a motion reference flag, and may derive a motion vector value of a current processing block using the motion vector prediction value and the received motion vector difference.

The decoder performs motion compensation on a prediction unit using a decoded motion parameter (or information).

That is, the encoder/the decoder performs motion compensation for predicting an image of a current unit from a previously decoded picture using a decoded motion parameter.

FIG. 5 is an embodiment to which the present invention may be applied, and is a diagram for illustrating an affine motion model.

A known image coding technology uses translation motion model in order to represent a motion of a coding block. In this case, the translation motion model indicates a prediction method based on a translation-moved block. That is, motion information of a coding block is represented using a single motion vector. However, an optimal motion vector for each pixel may be different within an actual coding block. If an optimal motion vector can be determined in each pixel or sub-block unit using only small information, coding efficiency can be enhanced.

Accordingly, the present invention proposes an inter prediction-based image processing method into which various motions of an image have been incorporated in addition to a translation-moved block-based prediction method in order to increase performance of inter prediction.

Furthermore, the present invention proposes a method of improving the accuracy of prediction and enhancing compression performance by incorporating motion information of a sub-block or pixel unit.

Furthermore, the present invention proposes an affine motion prediction method of performing coding/decoding using an affine motion model. The affine motion model indicates a prediction method of deriving a motion vector in a pixel unit or sub-block unit using the motion vector of a control point.

Referring to FIG. 5, various methods may be used to represent the distortion of an image as motion information. Particularly, the affine motion model may represent the four motions shown in FIG. 5.

For example, the affine motion model may model given image distortion occurring due to the translation of an image, the scale of an image, the rotation of an image, or the shearing of an image.

The affine motion model may be represented using various methods. From among the various methods, the present invention proposes a method of indicating (or identifying) distortion using motion information at a specific reference point (or reference pixel/sample) of a block and performing inter prediction using the distortion. In this case, the reference point may be called a control point (CP) (or control pixel or control sample). A motion vector at such a reference point may be called a control point motion vector (CPMV). A degree of distortion that may be represented may be different depending on the number of control points.

The affine motion model may be represented using six parameters (a, b, c, d, e, and f) as in Equation 1.

$$\begin{cases} v_x = a*x + b*y + c \\ v_y = d*x + e*y + f \end{cases} \quad \text{[Equation 1]}$$

In this case, (x,y) indicates the location of the top left pixel of a coding block. Furthermore, v_x and v_y indicate motion vector in (x,y).

FIGS. 6 and 7 are embodiments to which the present invention may be applied, and are diagrams for illustrating an affine motion prediction method using a control point motion vector.

Referring to FIG. 6, the top left control point (CP$_0$) 602 (hereinafter referred to as "first control point"), top right control point (CP$_1$) 603 (hereinafter referred to as "second control point"), and bottom left control point (CP$_2$) 604 (hereinafter referred to as "third control point") of a current block 601 may have independent motion information. They may be represented CP$_0$, CP$_1$, and CP$_2$, respectively. However, this corresponds to an embodiment of the present invention, and the present invention is not limited thereto. For example, a control point may be defined in various ways, such as a bottom right control point, a center control point, and a control point for each location of a sub-block.

In an embodiment of the present invention, at least one of the first control point to the third control point may be a pixel included in a current block. Alternatively, for another example, at least one of the first control point to the third control point may be a pixel that neighbors a current block and that is not included in the current block.

Motion information for each pixel or sub-block of the current block 601 may be derived using motion information of one or more of the control points.

For example, the affine motion model may be defined like Equation 2 using the motion vectors of the top left control point 602, top right control point 603 and bottom left control point 604 of the current block 601.

$$\begin{cases} v_x = \frac{(v_{1x} - v_{0x})}{w}*x + \frac{(v_{2x} - v_{0x})}{h}*x + v_{0x} \\ v_y = \frac{(v_{1y} - v_{0y})}{w}*x - \frac{(v_{2y} - v_{0y})}{h}*y + v_{0y} \end{cases} \quad \text{[Equation 2]}$$

In this case, assuming that $\vec{v_0}$ is the motion vector of the top left control point 602, $\vec{v_1}$ is the motion vector of the top right control point 603, and $\vec{v_2}$ is the motion vector of the bottom left control point 604, $\vec{v_0} = \{v_{0x}, v_{0y}\}$, $\vec{v_1} = \{v_{1x}, v_{1y}\}$, and $\vec{v_2} = \{v_{2x}, v_{2y}\}$ may be defined. Furthermore, in Equation 2, w indicates the width of the current block 601, and h indicates the height of the current block 601. Furthermore, $\vec{v} = \{v_x, v_y\}$ indicates the motion vectors of {x,y} locations.

In another embodiment of the present invention, an affine motion model that represents three motions of translation, scale, and rotate, among motions that may be represented by the affine motion model, may be defined. In this specification, the defined affine motion model is called a simplified affine motion model or a similarity affine motion model.

The similarity affine motion model may be represented using four parameters (a, b, c, d) like Equation 3.

$$\begin{cases} v_x = a*x - b*y + c \\ v_y = b*x + a*y + d \end{cases} \quad \text{[Equation 3]}$$

In this case, {v$_x$, v$_y$} indicates the motion vectors of {x,y} locations, respectively. As described above, an affine motion model using 4 parameters may be called AF4, but the present invention is not limited thereto. If 6 parameters are used, an affine motion model is called AF6, and the embodiments may be identically applied.

Referring to FIG. 7, assuming that $\vec{v_0}$ is the motion vector of the top left control point 701 of a current block and $\vec{v_1}$ is the motion vector of the top right control point 702 of the current block, $\vec{v_0} = \{v_{0x}, v_{0y}\}$, $\vec{v_1} = \{v_{1x}, v_{1y}\}$ may be defined. In this case, the affine motion model of AF4 may be defined like Equation 4.

$$\begin{cases} v_x = \frac{(v_{1x} - v_{0x})}{w}*x - \frac{(v_{1y} - v_{0y})}{w}*x + v_{0x} \\ v_y = \frac{(v_{1y} - v_{0y})}{w}*x - \frac{(v_{1x} - v_{0x})}{w}*y + v_{0y} \end{cases} \quad \text{[Equation 4]}$$

In Equation 4, w indicates the width of a current block, and h indicates the height of the current block. Furthermore, $\vec{v} = \{v_x, v_y\}$ indicates the motion vectors of {x,y} locations, respectively.

The encoder or the decoder may determine (or derive) a motion vector at each pixel location using a control point motion vector (e.g., the motion vectors of the top left control point 701 and the top right control point 702).

In the present invention, a set of motion vectors determined through affine motion prediction may be defined as an affine motion vector field. The affine motion vector field may be determined using at least one of Equations 1 to 4.

In a coding/decoding process, a motion vector through affine motion prediction may be determined in a pixel unit or a predefined (or pre-configured) block (or sub-block) unit. For example, if a motion vector is determined in a pixel unit, a motion vector may be derived based on each pixel within a block. If a motion vector is determined in a sub-block unit, a motion vector may be derived based on each sub-block unit within a current block. For another example, if a motion vector is determined in a sub-block unit, the motion vector of a corresponding sub-block may be derived based on a top left pixel or a center pixel.

Hereinafter, a case where a motion vector through affine motion prediction is determined in a 4×4 block unit is basically described for convenience of description in the description of the present invention, but the present invention is not limited thereto. The present invention may be applied in a pixel unit or in a block unit of a different size.

FIG. 8 is an embodiment to which the present invention may be applied, and is a diagram for illustrating a motion vector field indicating a motion vector set of a coding block.

Referring to FIG. 8, it is assumed that the size of a current block is 16×16. The encoder or the decoder may determine a motion vector in a 4×4 sub-block unit using the motion vectors of the top left control point 801 and top right control point 802 of the current block. Furthermore, the motion vector of a corresponding sub-block may be determined based on the center pixel value of each sub-block.

In FIG. 8, an arrow indicated at the center of each sub-block indicates a motion vector obtained by an affine motion model.

Affine motion prediction may be used as an affine merge mode (hereinafter referred to as an "AF merge mode") and an affine inter mode (hereinafter referred to as a "AF inter mode"). The AF merge mode is a method of deriving two control point motion vectors without encoding a motion vector difference, like the skip mode or the merge mode, and encoding or decoding the motion vectors. The AF inter mode is a method of determining a control point motion vector predictor and a control point motion vector and encoding or decoding a control point motion vector difference corresponding to a difference between the control point motion vector predictor and the control point motion vector. In this case, in the case of AF4, the motion vector difference of two control points is transmitted. In the case of AF6, the motion vector difference of three control points is transmitted.

FIG. 9 is an embodiment to which the present invention may be applied, and is a diagram for illustrating a process of determining a control point motion vector for affine prediction.

The encoder or the decoder to which the present invention is applied may determine a control point motion vector for affine prediction. This follows the following process.

In an embodiment, there is proposed a method of deriving a control point motion vector prediction value in the AF inter mode. The control point motion vector prediction value may be configured with the two-motion vector pair of a first control point and a second control point, and a candidate list of two control point motion vector prediction values may be configured. In this case, the encoder may signal an index, indicating an optimal control point motion vector prediction value, among two candidates.

First, the encoder or the decoder may determine a motion vector candidate list for affine prediction based on two control points. Assuming that the motion vector of the top left pixel (or block) of a current block is v0 and the motion vector of the top right pixel (or block) thereof is v1, a motion vector pair may be represented as (v0, v1). For example, referring to FIG. 9, candidate lists of (v0, v1) may be configured with the motion vectors of pixels (or blocks) neighboring a top left pixel (or block) and a top right pixel (or block), respectively. As a detailed example, the candidate list of v0 may be configured with the motion vectors of A, B, and C pixels (or blocks) neighboring the top left pixel (or block). The candidate list of v1 may be configured with the motion vectors of D and E pixels (or blocks) neighboring the top right pixel (or block). This may be represented like Equation 5.

$$\{(v_0,v_1)|v_0=\{v_A,v_B,v_C\},v_1=\{v_D,v_E\}\}$$ [Equation 5]

In this case, $V_A$, $V_B$, $V_C$, $V_D$, and $V_E$ indicate the motion vectors of the A, B, C, D, and E pixels (or blocks), respectively.

In another embodiment, the encoder or the decoder may determine a motion vector candidate list for affine prediction based on three control points.

For example, referring to FIG. 9, in order to determine motion vector candidate lists of (v0, v1, v2), the motion vectors (v0, v1, v2) of three control points may be taken into consideration. That is, the motion vector candidate lists of (v0, v1, v2) may be configured with the motion vectors of pixels (or blocks) neighboring the top left pixel (or block), the top right pixel (or block), and the bottom left pixel (or block), respectively. The motion vectors (v0, v1, v2) of the three control points may be represented like Equation 6.

$$\{(v_0,v_1,v_2)|v_0=\{v_A,v_B,v_C\},v_1=\{v_D,v_E\},v_2=\{v_F,v_G\}\}$$ [Equation 6]

In this case, $V_A$, $V_B$, $V_C$, $V_D$, $V_E$, $V_F$, and $V_G$ indicate the motion vectors of the respective A, B, C, D, E, F, and G pixels (or blocks).

The encoder or the decoder may calculate divergence values of vectors for the motion vectors (v0, v1) or (v0, v1, v2), may sort the divergence values in smaller order, and then may use two upper (two smallest values) candidates. In this case, the divergence value is a value indicating similarity in the direction of motion vectors. As a divergence value is smaller, it may mean that motion vectors have similar directions, but the present invention is not limited thereto. One, three or four upper values of divergence values may be used. An embodiment may be applied in various ways depending on how many control points are used.

The divergence value may be defined by Equation 7.

$$DV=|(v1_x-v0_x)*h-(v2_y-v0_y)*w|+|(v1_y-v0_y)*h+(v2_x-v0_x)*w|$$ [Equation 7]

In this case, h and w indicate the height and width of a current block. $(v0_x)$, $(v1_x)$, and $(v2_x)$ indicate the x components of motion vectors of the top left pixel (or block), top right pixel (or block), and bottom left pixel (or block) of a current block, respectively. $(v0_y)$, $(v1_y)$, and $(v2_y)$ indicate the y components of motion vectors of the top left pixel (or block), top right pixel (or block), and bottom left pixel (or block) of the current block, respectively.

In another embodiment, $v_2$ and $v_3$ may be redefined and used as values derived by an affine motion model based on $v_0$ and $v_1$.

When two smallest divergence values are determined as motion vector candidates as described above, the encoder or the decoder may identify a rate-distortion cost for the two motion vector candidates, and may determine a control point motion vector based on the result of the rate-distortion cost. The determined control point motion vector may be derived or signaled as a motion vector predictor.

Meanwhile, when the number of motion vector candidates is smaller than 2, an advanced motion vector prediction (AMVP) candidate list may be used. For example, the encoder or the decoder may add candidates of an AMVP candidate list to a motion vector candidate list. As a detailed example, if the candidates of a motion vector candidate list are 0, the encoder or the decoder may add two upper candidates of an AMVP candidate list to a candidate list. If candidates of a motion vector candidate list is 1, the encoder or the decoder may add the first candidate of an AMVP candidate list to a motion vector candidate list. In this case, the embodiments described in FIG. 4 may be applied to the AMVP candidate list.

When a control point motion vector is determined through such a process, the determined control point motion vector may be derived or signaled as a motion vector predictor.

FIG. 10 is an embodiment to which the present invention may be applied, and is a diagram for illustrating a method using a control block motion vector for affine prediction.

The present embodiment proposes a method using a control block motion vector for affine prediction. A control block may be defined as a 4×4 sub-block CB0, CB1 at the corner of a current block as in FIG. 10, but the present invention is not limited thereto. At least one of a top left corner block, a top right corner block, a bottom left corner block, a bottom right corner block or a center block may be used. Hereinafter, in an embodiment, the top left corner block CB0 and the top right corner block and CB1 are basically described, but other embodiments may also be identically applied.

A control block motion vector v0, v1 may be derived by an affine motion model of Equation 8 based on the motion vectors of neighbor blocks A, B, C, D, and E at corresponding block locations.

$$\begin{cases} v_x = \dfrac{v_{j,x} - v_{i,x}}{w} * x - \dfrac{v_{j,y} - v_{i,y}}{h} * y + v_{i,x} \\ v_y = \dfrac{v_{j,y} - v_{i,y}}{w} * x + \dfrac{v_{j,x} - v_{i,x}}{h} * y + v_{i,y} \end{cases} \quad \text{[Equation 8]}$$

In this case, i and j indicate neighbor blocks, w and h indicate the width and height of a virtual block based on the center value of the i and j blocks and a control block.

A motion vector field may be determined based on a control block motion vector determined through the above equation.

FIG. 11 is an embodiment to which the present invention may be applied, and is a diagram for illustrating a method of determining a control point motion vector when the height or width of a coding block is 4.

The present embodiment proposes a method of determining a control point motion vector when the width or height of a current block is 4.

As in FIG. 11(a), in the case of sub-blocks (CB0, CB1, CB2, and CB3) including corner points, control point motion vectors (V0 & V1) or corner point motion vectors (V2 & V3) derived by control point motion vectors may be used as MVFs instead of a motion vector derived based on the center value of a sub-block. In this case, the corner point motion vector may also be considered to be a control point motion vector.

As in FIG. 11(b), when the height of a current block is 4 (or the width is 4), 1 sub-block may share two control points. As a result, a CB0 may use V2 as an MVF, and a CB1 may use V3 as an MVF. However, if affine prediction is performed on a block sharing two control points as described above, mismatch may occur between the encoder and the decoder.

Accordingly, the present invention provides a method using one control block motion vector if the height or width of a current block is 4 using the concept of a control block instead of a control point.

In another embodiment, the present invention provides a method of determining a control point motion vector for affine prediction.

First, the encoder or the decoder may determine two candidates for the control block motion vector V0.

For example, referring to FIG. 9, the encoder or the decoder may determine the first candidate V0_1 based on an affine motion model using the motion vector v_A of the block A and the motion vector v_B of the block B as input. Furthermore, the encoder or the decoder may determine the second candidate V0_2 based on an affine motion model using the motion vector v_A of the block A and the motion vector v_C of the block C as input.

Thereafter, the encoder or the decoder may determine candidates of the control block motion vector V1. In this case, the encoder or the decoder may determine V1 according to an affine motion model using the motion vectors v_D and v_E of the block D and the block E.

The encoder or the decoder may determine a control block motion vector to be used for affine prediction among control block motion vector pairs {V0_1, V1} and {V0_2, V1}. In this case, the determined control block motion vector may be adaptively signaled or derived based on the number of available neighbor blocks.

In another embodiment, the present invention provides another method of determining a control block motion vector.

The encoder or the decoder may determine three candidates of a control block motion vector V0.

First, the encoder or the decoder may determine the first candidate V0_1 according to an affine motion model using the motion vector v_A of the block A and the motion vector v_B of the block B as input.

The encoder or the decoder may determine the second candidate V0_2 according to an affine motion model using the motion vector v_A of the block A and the motion vector v_C of the block C as input.

The encoder or the decoder may determine the third candidate V0_3 according to an affine motion model using the motion vector v_A of the block A, the motion vector v_B of the block B, and the motion vector v_C of the block C as input.

In this case, a 6-parameter affine model may be used like Equation 9.

$$\begin{cases} v_x = \dfrac{v_{j,x} - v_{i,x}}{w} * x - \dfrac{v_{k,x} - v_{i,x}}{h} * y + v_{i,x} \\ v_y = \dfrac{v_{j,y} - v_{i,y}}{w} * x + \dfrac{v_{k,y} - v_{i,y}}{h} * y + v_{i,y} \end{cases} \quad \text{[Equation 9]}$$

In this case, i, j, and k indicate neighbor blocks. w and h indicate the width and height of a virtual block based on the center value of the i, j, and k blocks and a control block.

Furthermore, the encoder or the decoder may determine a candidate of a control block motion vector V1. In this case, V1 may be determined according to an affine motion model using the motion vectors v_D and v_E of the block D and the block E.

The encoder or the decoder may determine a control block motion vector to be used for affine prediction among control block motion vector pairs {V0_1, V1}, {V0_2, V1}, or {V0_3, V1}. The determined control block motion vector may be adaptively signaled or be derived based on the number of available neighbor blocks.

In another embodiment, the present invention provides a detailed method of signaling a control block motion vector.

For example, after three control block motion vector pairs are sorted in order of smaller divergence value, 0 may be allocated to a control block motion vector pair having the smallest value, and 10 or 11 bits may be allocated to the remaining control block motion vector pairs.

Alternatively, 0 may be allocated to a control block motion vector pair having the smallest value, and 1 may be allocated to a control block motion vector pair having the second smallest value.

FIG. 12 is an embodiment to which the present invention may be applied, and is a diagram for illustrating a method of performing affine prediction on an N×4 block or 4×N block.

As in FIG. 12, if the size of a coding block is 4×N or N×4, only two sub-blocks including corner points are present, but four corner point motion vectors are present. Such a case may be defined as affine prediction ambiguity.

As in FIG. 11(a), in the case of CB_L and CB_R, V2 and V3 are finally stored in a motion vector field and used in an N×4 block of FIG. 12(a) because control point motion vectors V0, V1, V2, and V3 are stored in order of CB0, CB1, CB2, and CB3. Furthermore, in an 4×N block, in CB_U and CB_B, V1 and V3 are stored in a motion vector field and used.

Affine prediction for an N×4 or 4×N block is performed in the AF merge mode (AF_MERGE), but is not performed in the AF inter mode (AF_INTER). If encoding is actually performed in the AF inter mode, there is a problem in that mismatch occurs between the encoder and the decoder. Accordingly, the present invention provides various embodiments for solving the mismatch.

Embodiment 1

An embodiment of the present invention proposes an affine prediction method for an N×4 or 4×N block. In order to solve an affine prediction ambiguity problem, a motion vector derived based on the center location of each sub-block according to an affine motion model instead of V0, V1, V2, and V3 in a block (CB) including a control point may be stored in a motion vector field and used in an N×4 or 4×N block. For example, in the case of the CB_L and CB_R of an N×4 block, a motion vector based on the center location of CB_L and CB_R derived according to an affine motion model using V0 and V1 as input may be used in a motion vector field without any change.

Embodiment 2

An embodiment of the present invention provides a method of deriving a control point motion vector for the AF merge mode (AF_MERGE) of a current block when a neighbor affine block used for the AF merge mode (AF_MERGE) is encoded according to Embodiment 1.

For example, assuming that the center location coordinates of CB_L or CB_U are (0, 0), a motion vector derived according to an affine motion model may be determined as the control point motion vector of a current block.

Embodiment 3

For another example, the embodiments described in this specification may be identically applied to all size blocks in addition to N×4 and 4×N sizes.

Embodiment 4

For another example, the present invention provides a method of solving the affine prediction ambiguity of an N×4 or 4×N block.

For example, in the case of an N×4 block, V0 is stored in a motion vector field in the case of CB_L and V1 is stored in a motion vector field in the case of CB_R, and the stored V0 and V1 are used as a motion vector and a control point motion vector. Furthermore, in the case of a 4×N block, V0 is stored in a motion vector field in the case of CB_U and V2 is stored in a motion vector field in the case of CB_B, and the stored V0 and V2 are used as a motion vector and a control point motion vector.

Embodiment 5

For another example, the present invention provides a method of deriving a control point motion vector for the AF merge mode (AF_MERGE) of a current block when a neighbor affine block used to encode the AF merge mode (AF_MERGE) is encoded according to Embodiment 4.

Assuming that the V0 location (N×4 block) coordinates of CB_L or the V0 location (4×N block) coordinates of CB_U in Embodiment 1 are (0, 0), a motion vector derived according to an affine motion model may be determined as the control point motion vector of a current block.

Embodiment 6

For another example, the present invention provides a method of storing an average value of control point motion vectors, included in a CB, in a motion vector field and using the average value as a control point motion vector in the case of an N×4 or 4×N block.

For example, in the case of an N×4 block, CB_L uses an average value of V0 and V2 and CB_R may use an average value of V1 and V3. Furthermore, in the case of a 4×N block, CB_U may use an average value of V0 and V1, and CB_B may use an average value of V2 and V3.

Embodiment 7

For another example, the present invention provides a method of deriving a control point motion vector for the AF merge mode (AF_MERGE) of a current block when a neighbor affine block used to encode the AF merge mode (AF_MERGE) is encoded according to Embodiment 6.

For example, assuming that the center location coordinates of CB_L or CB_U are (0, 0), a motion vector derived according to an affine motion model may be determined as the control point motion vector of a current block.

Embodiment 8

Embodiments 6 and 7 may be identically applied to all size blocks in addition to an N×4 and 4×N size.

FIG. 13 is an embodiment to which the present invention may be applied, and is a flowchart illustrating a process of decoding a video signal according to an inter prediction mode.

The decoder may receive a video signal including a current block (S1310).

The decoder may identify whether the AF merge mode is applied to the current block (S1320). If, as a result of the identification at step S1320, the AF merge mode is applied to the current block, decoding may be performed based on the AF merge mode (S1330). If the AF merge mode is applied, the decoder may generate a candidate list of the control point motion vectors of the current block, and may use a motion vector, determined based on an index (or flag) value received from the encoder, as a motion vector predictor.

If, as a result of the identification at step S1320, the AF merge mode is not applied to the current block, the decoder may identify whether the AF inter mode is applied (S1340). If, as a result of the identification at step S1340, the AF inter mode is applied to the current block, the decoder may perform decoding based on the AF inter mode (S1350). If the AF inter mode is applied, the decoder may generate a candidate list of control point motion vectors, may determine a motion vector predictor using an index (or flag) value received from the encoder, and may determine a control point motion vector by summing the differences of motion vector predictors received from the encoder.

If, as a result of the identification at step S1340, the AF inter mode is not applied to the current block, the decoder may perform decoding based on a prediction mode other than the AF merge mode and the AF inter mode (S1360).

FIG. 14 is an embodiment to which the present invention may be applied, and is a flowchart illustrating a process of processing a video signal including a current block using an affine prediction mode.

The present invention provides a method of processing a video signal including a current block using an affine prediction mode.

First, the video signal processor may generate a candidate list of motion vector pairs using the motion vector of a pixel or block neighboring at least two control points of a current block (S1410). In this case, the control point means the corner pixel of the current block, and the motion vector pair indicates the motion vector of the top left corner pixel and top right corner pixel of the current block.

In an embodiment, the control point may include at least two of the top left corner pixel, top right corner pixel, bottom left corner pixel or bottom right corner pixel of the current block. The candidate list may be configured with pixels or blocks neighboring the top left corner pixel, the top right corner pixel, and the bottom left corner pixel.

In an embodiment, the candidate list may be generated based on the motion vectors of the diagonal neighbor pixel A, top neighbor pixel B, and left neighbor pixel C of the top left corner pixel, the motion vectors of the top neighbor pixel D and diagonal neighbor pixel E of the top right corner pixel, and the motion vectors of the left neighbor pixel F and diagonal neighbor pixel G of the bottom left corner pixel.

In an embodiment, the method may further include the step of adding an AMVP candidate list to the candidate list when the motion vector pairs of the candidate list is smaller than 2.

In an embodiment, when the current block is an N×4 size, the control point motion vector of the current block may be determined as a motion vector derived based on the center positions of the left sub-block and the right sub-block within the current block. When the current block is a 4×N size, the control point motion vector of the current block may be determined as a motion vector derived based on the center positions of the top sub-block and bottom sub-block within the current block.

In an embodiment, when the current block is an N×4 size, the control point motion vector of a left sub-block within the current block is determined by an average value of the first control point motion vector and the third control point motion vector, and the control point motion vector of a right sub-block within the current block is determined by an average value of the second control point motion vector and the fourth control point motion vector. When the current block is a 4×N size, the control point motion vector of a top sub-block within the current block is determined by an average value of the first control point motion vector and the second control point motion vector, and the control point motion vector of a bottom sub-block within the current block is determined by an average value of the third control point motion vector and the fourth control point motion vector.

In another embodiment, the method may include signaling a prediction mode or flag information indicating whether an affine prediction mode is performed.

In this case, the decoder may receive the prediction mode or flag information, may perform an affine prediction mode based on the prediction mode or the flag information, and may derive a motion vector according to the affine prediction mode. In this case, the affine prediction mode indicates a mode in which a motion vector is derived in a pixel or sub-block unit using the control point motion vector of a current block.

Meanwhile, the video signal processor may determine the final candidate list of a predetermined number of motion vector pairs based on a divergence value of the motion vector pair (S1420). In this case, the final candidate list may be determined in order of small divergence value, and the divergence value means a value indicating similarity in the direction of the motion vectors.

The video signal processor may determine the control point motion vector of the current block based on a rate-distortion cost from the final candidate list (S1430).

The video signal processor may generate the motion vector predictor of the current block based on the control point motion vector (S1440).

As described above, the embodiments described in the present invention may be implemented and performed on a processor, a micro processor, a controller or a chip. For example, the function units shown in FIGS. 1 and 2 may be implemented and performed on a computer, a processor, a micro processor, a controller or a chip.

Furthermore, the decoder and the encoder to which the present invention is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an Internet streaming service provision device, a three-dimensional (3D) video device, a video telephony device, and a medical video device, and may be used to process a video signal and a data signal.

Furthermore, the processing method to which the present invention is applied may be produced in the form of a program executed by a computer, and may be stored in a computer-readable recording medium. Multimedia data having a data structure according to the present invention may also be stored in a computer-readable recording medium. The computer-readable recording medium includes all types of storage devices in which computer-readable data is stored. The computer-readable recording medium may include Blueray disk (BD), a universal serial bus (USB), ROM, RAM, CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

INDUSTRIAL APPLICABILITY

The above-described preferred embodiments of the present invention have been disclosed for illustrative purposes, and those skilled in the art may improve, change, substitute, or add various other embodiments without departing from the technical spirit and scope of the present invention disclosed in the attached claims.

The invention claimed is:

1. A method of processing a video signal comprising a current block using an affine prediction mode by an apparatus, the method comprising:
generating a candidate list of motion vector pairs using a motion vector of a pixel or block neighboring at least two control points of the current block, wherein the control point comprises at least two of a top left corner pixel, a top right corner pixel, a bottom left corner pixel or a bottom right corner pixel of the current block, the motion vector pair indicates motion vectors of the top left corner pixel and the top right corner pixel or the top left corner pixel, the top right corner pixel and the bottom left corner pixel of the current block, and the candidate list is configured with motion vectors of pixels or blocks neighboring the top left corner pixel, the top right corner pixel, and the bottom left corner pixel;
determining a final candidate list of a predetermined number of motion vector pairs based on a divergence value of the motion vector pair, wherein the final candidate list is determined in order of smaller divergence value, and the divergence value is calculated based on a difference of x component between the motion vectors, a difference of y component between the motion vectors, and height and width of the current block and becomes smaller when the motion vectors have similar directions;
determining a control point motion vector of the current block based on a rate-distortion cost from the final candidate list; and
generating a motion vector predictor of the current block based on the control point motion vector.

2. The method of claim 1,
wherein the candidate list is generated based on motion vectors of a diagonal neighbor pixel A, top neighbor pixel B, and left neighbor pixel C of the top left corner pixel, motion vectors of a top neighbor pixel D and diagonal neighbor pixel E of the top right corner pixel, and motion vectors of a left neighbor pixel F and diagonal neighbor pixel G of the bottom left corner pixel.

3. The method of claim 1, further comprising:
adding an Advanced Motion Vector Prediction (AMVP) candidate list to the candidate list when the motion vector pairs of the candidate list are smaller than 2 in number.

4. The method of claim 1, further comprising:
signaling a prediction mode or flag information indicating whether the affine prediction mode is performed,
wherein the affine prediction mode indicates a mode in which a motion vector is derived in a pixel or subblock unit using the control point motion vector of the current block.

5. The method of claim 1,
wherein when the current block is an N×4 size, the control point motion vector of the current block is determined as a motion vector derived based on a center position of a left subblock and right subblock within the current block, and
wherein when the current block is a 4×N size, the control point motion vector of the current block is determined as a motion vector derived based on a center position of a top subblock and bottom subblock within the current block.

6. The method of claim 1,
wherein when the current block is an N×4 size, a control point motion vector of a left subblock within the current block is determined by an average value of a first control point motion vector and a third control point motion vector, and a control point motion vector of a right subblock is determined by an average value of a second control point motion vector and a fourth control point motion vector, and
wherein when the current block is a 4×N size, a control point motion vector of a top subblock within the current block is determined by an average value of a first control point motion vector and a second control point motion vector, and a control point motion vector of a bottom subblock is determined by an average value of a third control point motion vector and a fourth control point motion vector.

7. An apparatus for processing a video signal comprising a current block using an affine prediction mode, the apparatus comprising:
a memory; and
an inter prediction unit configured to generate a candidate list of motion vector pairs using a motion vector of a pixel or block neighboring at least two control points of the current block, determine a final candidate list of a predetermined number of motion vector pairs based on a divergence value of the motion vector pair, determine a control point motion vector of the current block based on a rate-distortion cost from the final candidate list, and generate a motion vector predictor of the current block based on the control point motion vector,
wherein the control point comprises at least two of a top left corner pixel, a top right corner pixel, a bottom left corner pixel or a bottom right corner pixel of the current block,
wherein the motion vector pair indicates motion vectors of the top left corner pixel and the top right corner pixel or the top left corner pixel, the top right corner pixel and the bottom left corner pixel of the current block,
wherein the candidate list is configured with motion vectors of pixels or blocks neighboring the top left corner pixel, the top right corner pixel, and the bottom left corner pixel, and
wherein the final candidate list is determined in order of smaller divergence value, and the divergence value is calculated based on a difference of x component between the motion vectors, a difference of y component between the motion vectors, and height and width of the current block and becomes smaller when the motion vectors have similar directions.

8. The apparatus of claim 6,
wherein the candidate list is generated based on motion vectors of a diagonal neighbor pixel A, top neighbor pixel B, and left neighbor pixel C of the top left corner pixel, motion vectors of a top neighbor pixel D and diagonal neighbor pixel E of the top right corner pixel, and motion vectors of a left neighbor pixel F and diagonal neighbor pixel G of the bottom left corner pixel.

9. The apparatus of claim 7, wherein the inter prediction unit is configured to add an Advanced Motion Vector Prediction (AMVP) candidate list to the candidate list when the motion vector pairs of the candidate list are smaller than 2 in number.

10. The apparatus of claim 7, wherein the apparatus signals a prediction mode or flag information indicating whether the affine prediction mode is performed, and
wherein the affine prediction mode indicates a mode in which a motion vector is derived in a pixel or subblock unit using the control point motion vector of the current block.

11. The apparatus of claim 7, wherein when the current block is an N×4 size, the control point motion vector of the current block is determined as a motion vector derived based on a center position of a left subblock and right subblock within the current block, and
wherein when the current block is a 4×N size, the control point motion vector of the current block is determined as a motion vector derived based on a center position of a top subblock and bottom subblock within the current block.

12. The apparatus of claim 7, wherein when the current block is an N×4 size, a control point motion vector of a left subblock within the current block is determined by an average value of a first control point motion vector and a third control point motion vector, and a control point motion vector of a right subblock is determined by an average value of a second control point motion vector and a fourth control point motion vector, and
wherein when the current block is a 4×N size, a control point motion vector of a top subblock within the current block is determined by an average value of a first control point motion vector and a second control point motion vector, and a control point motion vector of a bottom subblock is determined by an average value of a third control point motion vector and a fourth control point motion vector.

\* \* \* \* \*